(12) United States Patent
Banerjee et al.

(10) Patent No.: US 8,942,870 B2
(45) Date of Patent: Jan. 27, 2015

(54) CONTROL SYSTEM FOR A ELECTRICAL VEHICLE

(75) Inventors: Dev Kumar Banerjee, Southampton (GB); David Huw Taylor, Sopley (GB)

(73) Assignee: Penny & Giles Controls Limited (GB)

( * ) Notice: Subject to any disclaimer, the term of this patent is extended or adjusted under 35 U.S.C. 154(b) by 1469 days.

(21) Appl. No.: 12/093,805

(22) PCT Filed: Nov. 15, 2006

(86) PCT No.: PCT/GB2006/004263
§ 371 (c)(1),
(2), (4) Date: Nov. 18, 2008

(87) PCT Pub. No.: WO2007/057666
PCT Pub. Date: May 24, 2007

(65) Prior Publication Data
US 2009/0228164 A1      Sep. 10, 2009

(30) Foreign Application Priority Data

Nov. 15, 2005 (GB) .................................. 0523237.6

(51) Int. Cl.
*G06F 17/00* (2006.01)
*A61G 5/04* (2013.01)
*B60L 3/12* (2006.01)

(52) U.S. Cl.
CPC . *A61G 5/045* (2013.01); *B60L 3/12* (2013.01); *A61G 2203/14* (2013.01); *B60L 2200/34* (2013.01); *Y02T 90/16* (2013.01)
USPC .............................................. 701/22; 701/36

(58) Field of Classification Search
CPC . B60W 30/00; B60L 2200/24; B60L 2200/34
See application file for complete search history.

(56) References Cited

U.S. PATENT DOCUMENTS

| | | | |
|---|---|---|---|
| 5,261,058 A | 11/1993 | Squires et al. | |
| 5,274,311 A | 12/1993 | Littlejohn et al. | |
| 5,497,056 A | 3/1996 | Kurland et al. | |
| 5,513,107 A * | 4/1996 | Gormley | 701/48 |
| 5,630,159 A * | 5/1997 | Zancho | 709/221 |
| 6,104,971 A * | 8/2000 | Fackler | 701/36 |
| 6,127,947 A * | 10/2000 | Uchida et al. | 340/999 |
| 6,184,656 B1 | 2/2001 | Karunasiri et al. | |
| 6,198,996 B1 * | 3/2001 | Berstis | 701/36 |
| 6,230,082 B1 * | 5/2001 | Harada et al. | 701/1 |

(Continued)

FOREIGN PATENT DOCUMENTS

| | | |
|---|---|---|
| EP | 0997820 B1 | 7/2003 |
| GB | 2224373 A | 5/1990 |

(Continued)

*Primary Examiner* — Jonathan M Dager
(74) *Attorney, Agent, or Firm* — Waddey & Patterson, P.C.; Emily A. Shouse; Gary L. Montle

(57) ABSTRACT

A control system for controlling the functionality of an electrically powered vehicle is described. The control system comprises a plurality of control modules in electronic communication with each of the control modules being programmed to implement a specific control function for the vehicle. The control modules comprise a first memory for storing data for implementing the control function, and the system further comprises at least one second memory for storing data for implementing each control function of the separate modules, wherein the data can be recorded to the second memory from the control modules.

11 Claims, 2 Drawing Sheets

(56) References Cited

U.S. PATENT DOCUMENTS

| | | | |
|---|---|---|---|
| 6,377,860 B1* | 4/2002 | Gray et al. | 700/83 |
| 6,615,123 B2* | 9/2003 | Morehouse | 701/49 |
| 6,694,235 B2* | 2/2004 | Akiyama | 701/29.6 |
| 6,694,483 B1* | 2/2004 | Nagata | 715/201 |
| 6,775,603 B2* | 8/2004 | Yester et al. | 701/36 |
| 6,795,754 B2* | 9/2004 | Sunami et al. | 701/1 |
| 6,819,986 B2* | 11/2004 | Hong et al. | 701/33.4 |
| 6,895,316 B2* | 5/2005 | Chen et al. | 701/36 |
| 6,917,890 B2* | 7/2005 | Davis et al. | 702/85 |
| 7,085,632 B2* | 8/2006 | Nakaya | 701/49 |
| 7,120,507 B2* | 10/2006 | Tanaka | 700/20 |
| 7,133,756 B2* | 11/2006 | Jammu et al. | 701/31.6 |
| 7,415,332 B2* | 8/2008 | Ito et al. | 701/1 |
| 7,415,339 B2* | 8/2008 | Ikeda et al. | 701/49 |
| 7,684,926 B2* | 3/2010 | Okamoto | 701/115 |
| 7,685,162 B2* | 3/2010 | Heider et al. | 707/802 |
| 7,818,105 B2* | 10/2010 | Tsubota et al. | 701/29.1 |
| 8,160,781 B2* | 4/2012 | Naono et al. | 701/48 |
| 8,193,905 B2* | 6/2012 | Tsuji | 340/5.6 |
| 8,565,962 B2* | 10/2013 | Yoshiyama | 701/33.1 |
| 8,571,571 B2* | 10/2013 | Bauer et al. | 455/456.1 |
| 2001/0002814 A1* | 6/2001 | Suganuma et al. | 340/5.74 |
| 2001/0032038 A1 | 10/2001 | Eiting et al. | |
| 2003/0120395 A1* | 6/2003 | Kacel | 701/1 |
| 2004/0002793 A1* | 1/2004 | Tachibana et al. | 701/1 |
| 2004/0002799 A1* | 1/2004 | Dabbish et al. | 701/35 |
| 2004/0015272 A1* | 1/2004 | Vollmer et al. | 701/1 |
| 2004/0019416 A1* | 1/2004 | Chen et al. | 701/36 |
| 2004/0044454 A1* | 3/2004 | Ross et al. | 701/33 |
| 2004/0117537 A1* | 6/2004 | Marcel Vandensande | 710/305 |
| 2004/0204069 A1* | 10/2004 | Cui et al. | 455/557 |
| 2004/0254689 A1* | 12/2004 | Blazic et al. | 701/1 |
| 2005/0075759 A1* | 4/2005 | Furuta | 701/1 |
| 2005/0267663 A1* | 12/2005 | Naono et al. | 701/48 |
| 2006/0015234 A1* | 1/2006 | Luh | 701/51 |
| 2006/0036356 A1* | 2/2006 | Rasin et al. | 701/1 |
| 2006/0235579 A1* | 10/2006 | Oesterling et al. | 701/1 |
| 2006/0235587 A1* | 10/2006 | Clapperton et al. | 701/36 |
| 2007/0073908 A1* | 3/2007 | Gormley | 710/8 |

FOREIGN PATENT DOCUMENTS

| | | |
|---|---|---|
| GB | 2394334 B | 7/2004 |
| JP | 2001134308 A | 5/2001 |
| WO | 9705844 A1 | 2/1997 |

* cited by examiner

CONTROL SYSTEM FOR A ELECTRICAL VEHICLE

CROSS-REFERENCES TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

The present invention relates to a control system for controlling functionality of an electrically powered vehicle, in particular but not exclusively a wheelchair.

Powered wheelchairs typically have customised settings for a particular user, for example a maximum acceleration to limit the forces upon a user's body. Known wheelchair control systems offered generally comprises a plurality of modules each responsible for the control of a specific aspect of the wheelchair operation, for example lighting control, seating control and the like.

The programming of the modules with specific user settings is a time consuming process. In some cases it can represent a considerable investment by a wheelchair distributor or provider, but is desirable for the comfort and safety of the user.

The modules' programmable data is typically stored in non-volatile memory such that the data will be retained if the power is lost. This allows for the system to remain configured if batteries are replaced or if the wheelchair is dismantled for transportation in a vehicle.

From a functional point of view it may be considered desirable for each module to store its own settings internally. This simplifies the system management since no other modules need to be involved, but it does have two drawbacks, the first regarding module replacement and the second regarding systems containing more than one module of the same or similar type.

The primary advantage of a module storing its own settings is that no other modules need interpret the size or meaning of the data stored by that module. Effectively, the module is self-contained. If the manufacturer develops a new version of the product with extra features, the new module can fit into an existing system, and the user can take advantage of the new features, with no need to change any of the existing modules in any way.

If a module develops a control system fault, it may be difficult to repair in situ. Instead, where the service personnel identify a faulty module, they will replace it and return the faulty module to a service centre. If the settings for the faulty module reside within the module, it can be a time-consuming task to copy the settings and program them into the replacement module. The procedure may also be susceptible to human error. Hence it is desirable for the system to store the settings for each module, and for the settings for a replacement to be changed automatically.

Where systems contain more than one module, it may be desirable for some of their programmable settings to be common. Separate storage for each module would work against this, requiring each module to be set up independently. It is possible to work around this using a more powerful programming tool, but it is better to establish a common data source for identical modules.

BRIEF SUMMARY OF THE INVENTION

In accordance with this invention as seen from a first aspect, there is provided a control system for controlling functionality of an electrically powered vehicle, the control system comprising a plurality of control modules in electronic communication, each of said control modules programmed to implement a specific control function for the vehicle and having first memory means for storing data for implementing said control function, said system further comprising at least one second memory means for storing data for implementing each said control function, wherein said data can be recorded to said second memory means from said control modules.

Thus the data for implementing the control function of a given module may be stored on the second memory means. In the event that the given module is replaced with a replacement module, the data may be copied from the second memory means to the replacement module. Thus, the replacement module will be able to function identically to the replaced module without being manually programmed to do so.

Preferably, said second memory means further holds data for implementing said control function that is common to at least two control modules of said plurality of control modules.

In accordance with this invention as seen from a second aspect, there is provided a control system for controlling functionality of an electrically powered vehicle, the control system comprising a plurality of control modules in electronic communication, each of said control modules programmed to perform a specific control function for the vehicle and having first memory means for storing data for implementing said control function, said system further comprising at least one second memory means for storing data for implementing said control functions of said plurality of control modules, wherein said second memory means further stores data which is common to at least two control modules thereby permitting data sharing between said at least two control modules.

In accordance with this invention as seen from a third aspect, there is provided a control system for controlling functionality of an electrically powered vehicle, the control system comprising a plurality of control modules in electronic communication, each of said control modules programmed to perform a specific control function for the vehicle and having first memory means for storing data for implementing said control function, said system further comprising at least one second memory means for storing data for implementing said control functions of said plurality of control modules, wherein said control modules determine when data is to be recorded to said second memory means or when data is to be read from said second memory means.

This provides for a flexible control system in which individual modules can determine when data transfer to or from the second memory means is required.

Preferably, said second memory means is housed in a control module.

Preferably, said data held by said second memory means can be transferred to said plurality of control modules.

Preferably, said control modules determine when data is to be transferred to said control modules from said second memory means.

Preferably, all control modules can access said second memory means.

Preferably, new control functions are compatible with existing control functions.

Preferably, only one of said plurality of control modules can access said second memory means at a given time.

Optionally, said second memory means is remote from said vehicle.

Optionally, said second memory means is not physically connected to said vehicle.

Preferably, said second memory means is housed in a control module which has the minimal likelihood of replacement compared to other modules in the system.

Preferably, the data stored in said second memory means is retained when power is removed.

Preferably, said system provides control of a motorized vehicle.

Preferably, said second memory means is housed in a vehicle motor controller.

In accordance with this invention as seen from a fourth aspect there is provided an electrically powered vehicle comprising a control system according to the first, second or third aspect of the invention.

BRIEF DESCRIPTION OF THE SEVERAL VIEWS OF THE DRAWING(S)

The preferred embodiment of this invention will now be given by way of example only and with reference to the accompanying drawings in which.

DETAILED DESCRIPTION OF THE INVENTION

Figure 1:
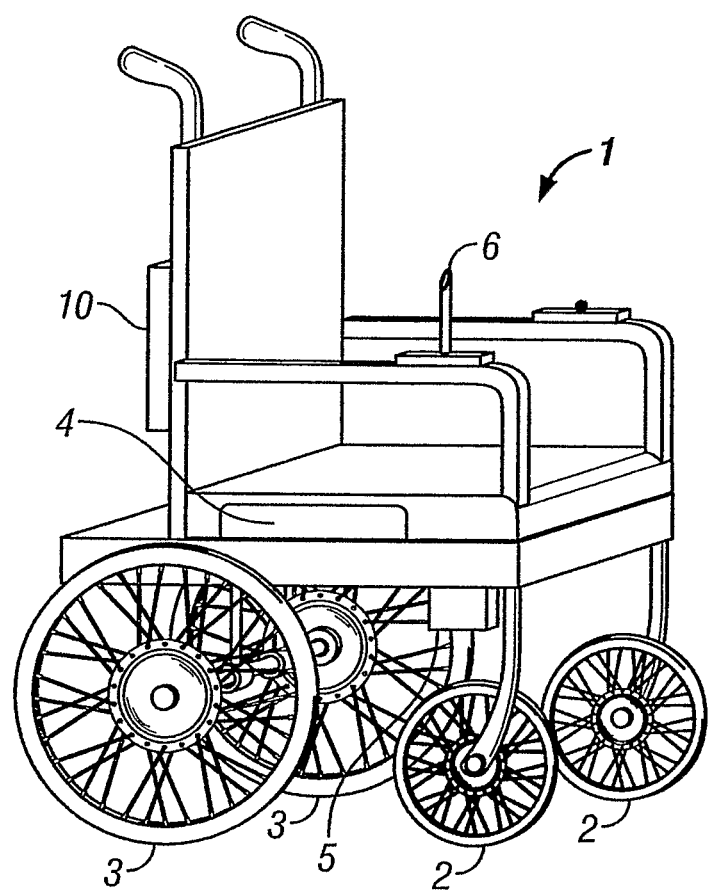
FIG. 1 illustrates a powered vehicle.

FIG. 1 illustrates an electrically powered vehicle, in this example a wheelchair 1 having front wheels 2 and back wheels 3. Power for the wheelchair 1 is provided by a battery 4 and drive for the back wheels 3 is provided by a motor arrangement 5. A user manipulable input means 6, for example a joystick, is used by a user (not shown) to control movement of the wheelchair 1. The wheelchair 1 further comprises a module based control system 10 for controlling various functions of the wheelchair 1.

Figure 2:
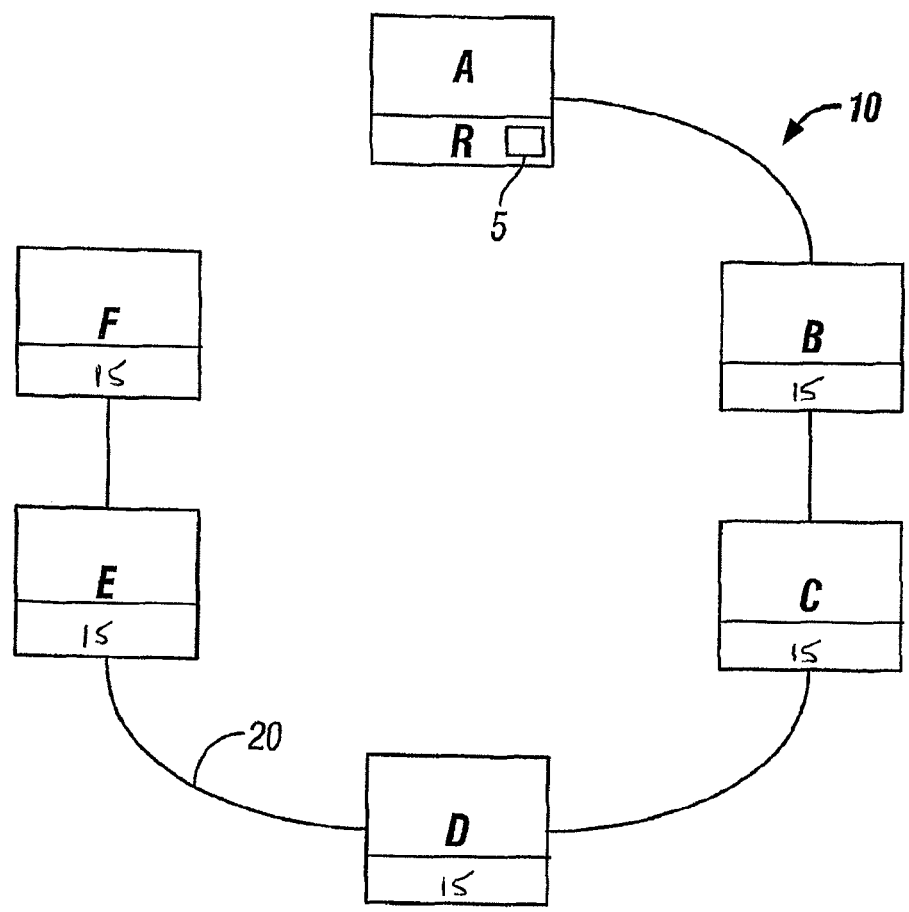
FIG. 2 illustrates a control system for the powered vehicle.

Referring to FIG. 2, the control system 10 comprises a plurality of modules A-F connected via a cable 20 which routes control signals and power between the modules A-F. Each module separately provides a distinct function of wheelchair operation such as wheelchair motor control, joystick control, seating control and lighting control etc, but when networked, the modules A-F cooperatively provide for the safe control of the powered wheelchair 1.

In the described system embodying the present invention, power is derived from the wheelchair's battery 4 and is provided to the network of modules via a wheelchair motor controller (not shown). Each module is programmed to perform certain functions and hold specific features, for example a user preferred maximum speed setting of a motor controller, or a user specific seating setting of a seating controller. The modules are thus programmed to meet the specific requirements of the user.

Each module comprises a non-volatile memory 15 for holding settings that are unique to that particular module. In addition however, one of the modules (in this example module A) comprises a storage facility, hereinafter referred to as a repository, R, for the data used by other modules.

The repository R is effectively a filing system. Data can be stored in it during manufacture and data can be stored in it and retrieved from it by other modules during use. In this manner, each module can share the settings of other modules such that if one module is replaced, its replacement will be able to read its settings from the repository R and then behave in an identical way to its antecedent, without any intervention by the user, dealers or servicing staff.

The repository R contains a number of slots, areas of non-volatile memory, each of which can contain a file(s). A file is a collection of bytes which contains a header, which is recognisable to the repository R, and data. The header holds the address of the data and is descriptive of the data contained within the file. The data on the other hand is not necessarily recognisable to the repository R and is exchangeable between modules. Only one module of the present embodiment can make use of the repository R at a time and while it has access to the repository R, only one slot is available at a given time. However, it is also envisioned that for certain operations, such as copying data from one file to another, it may be more efficient to provide another slot.

Preferably, the module housing the repository R has the minimal likelihood of replacement compared to other modules in the system and for it to always be present, however the system is configured. For wheelchair control systems, a good candidate is the wheelchair motor controller itself.

A procedure is provided (separate from the functions of the repository R) whereby if a new module is added to the system, all the modules detect that the new member is present and the system reconfigures. For example, when a new module is added to the system, the new module may transmit a signal to the other modules to inform the other modules of its addition to the system. During the re-configuration, the new module checks the repository R to see if there are any files relevant to its operation and decides whether to read the contents of the file which if necessary will cause the module to be reprogrammed to function in the same way as the one it replaces.

If a replacement module has some new programmable features, the versions of one or more of the files it uses will have been changed to include the new data. If such a module is added to a system, it can upgrade the corresponding file in the repository R with new version. The module initially reads the file from the repository and decides whether to merge the data it has read with the data it contains internally. The module then writes the new version of the file to the repository. Once the new settings have been stored, only the new version will be available such that any module attempting to read that file will only be able to access the new version.

Each new version of a file format is designed to be compatible with the previous version. Thus, modules which only make use of the data in an older version of the file are still able to find that data in any newer version and interpret it correctly.

Since all the modules of a particular type use the same file types, they all have access to common data. Whenever the data in that file is modified, for example by a programming tool or by any other module, the repository R notifies all the other modules that the relevant file has changed. Modules that make use of that data will independently synchronise with the new data at a time determined by each module. This does not mean however, that the modules will behave identically; all modules can be differentiated such that data targeted at particular modules can be embedded in the files in order to provide distinct behaviour.

File types can be associated with functions rather than the particular types of module. For example, a file might be designed to contain data associated with the lighting function (i.e. head/tail lights and direction indicators). This file may be interpreted by a module which only provides lighting functions, or by a module which combines those functions with something else, for example, positional control for the wheelchair setting.

During manufacture, a repository R can be loaded with files which are intended for use by particular modules that might be used with it. This allows appropriate behaviour to be pre-determined and can simplify manufacture and inventory management, since non-repository modules can be supplied without settings related to their eventual use.

If a module is added to a system where the repository R does not contain one or more files that it needs, the new module can use settings with which it was supplied, but still create the relevant files in the repository R, thereby guaranteeing that a replacement will continue to use the same settings.

Since the repository module is always available in a functioning system, modules could avoid storing data in local non-volatile storage and instead read the information from the repository afresh whenever the user switches on the system. This has some disadvantages, for example, delay before the system is usable, but it could be used by some modules with very modest storage.

Although the system has been described above with respect to a wheelchair it will also be appreciated that the system may also be used with other types of electrical or battery powered vehicles for example battery powered industrial vehicles and battery powered golf carts. Furthermore, the repository is not limited to being housed within a control module. The repository could equally be a removable plug-in memory source or a memory source in wireless telecommunication with the system.

The invention claimed is:

1. An on-board vehicle control system for controlling functionality of an electrically powered vehicle, the control system comprising
a plurality of replaceable control modules in electronic communication and configured to cooperatively provide for safe control of the electrically powered vehicle when networked,
each of said control modules programmed to implement a specific control function for the vehicle and having first memory for storing data, said data including control settings applicable to an individual user for implementing said control function,
said system further comprising at least one second memory for storing data, said data including control settings applicable to an individual user for implementing each said control function,
wherein said data including control settings applicable to an individual user is recorded to said second memory from said control modules such that in the event of failure of an individual control module, the failed control module is replaceable with a replacement control module and data for implementing the control function of the replacement control module is transferred thereto from the second memory,
wherein the replacement control module is configured to enable continued safe operation of the electrically powered vehicle.

2. A control system as claimed in claim 1, wherein said second memory further holds data for implementing a control function common to at least two of said plurality of control modules.

3. A control system as claimed in claim 1, wherein said second memory is housed in a control module.

4. A control system as claimed in claim 1, wherein said control functions held by said second memory is transferred to said plurality of control modules.

5. A control system as claimed in claim 4, wherein said control modules determine when data is to be transferred to said control modules from said second memory.

6. A control system as claimed in claim 1, wherein all control modules access said second memory.

7. A control system as claimed in claim 1, wherein new control functions are compatible with existing control functions.

8. A control system as claimed in claim 1, wherein only one of said plurality of control modules accesses said second memory at a given time.

9. A control system as claimed in claim 1, wherein the data stored in said second memory is retained when power is removed.

10. A control system as claimed in claim 1, wherein two or more of said replaceable control modules are networked such that upon modification of data for implementing a specific control function for a first control module, said data is interpreted by a second control module and the control function of the second control module is modified.

11. A control system as claimed in claim 1, wherein upon modification of data for implementing said control function stored on the first memory, the second memory stored modified data and notifies each of the control modules to synchronize with the modified data.

* * * * *